US006757803B1

(12) United States Patent
Lin et al.

(10) Patent No.: US 6,757,803 B1
(45) Date of Patent: Jun. 29, 2004

(54) DISTRIBUTED BUFFER RECOVERY

(75) Inventors: Minjie Lin, Sunnyvale, CA (US); Steven Howard Berl, Piedmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 335 days.

(21) Appl. No.: 09/971,535

(22) Filed: Oct. 4, 2001

(51) Int. Cl.[7] .............................................. G06F 13/00
(52) U.S. Cl. ...................... 711/170; 711/152; 711/156
(58) Field of Search ................................. 711/156, 152

(56) References Cited

U.S. PATENT DOCUMENTS

| 5,784,699 A | * | 7/1998 | McMahon et al. .......... 711/171 |
| 5,838,994 A | | 11/1998 | Valizadeh |
| 5,898,687 A | | 4/1999 | Harriman et al. |
| 6,212,613 B1 | | 4/2001 | Belair |

OTHER PUBLICATIONS

Tanenbaum, Andrew S. and Woodhull, Albert S., "Operating Systems: Design and Implementation," 1997, pp. 316–318, Second Edition, Prentice Hall, Upper Saddle River, New Jersey.

* cited by examiner

Primary Examiner—Reba I. Elmore
(74) Attorney, Agent, or Firm—Cesari and McKenna, LLP

(57) ABSTRACT

A memory usage data structure (MUDS) is maintained for each process executing in the computer system, the MUDS having a bitmap field having a bit corresponding to each block of allocatable memory. A bit corresponding to a selected memory block is set to the value of "1" when the selected memory block is allocated to the selected process. The bit corresponding to the selected memory block is set to the value of "0" when the selected memory block is not allocated to the selected process. A master MUDS is generated by combining the MUDS maintained by each process, the master MUDS having bits set to a value of "0" for free memory blocks, and the master MUDS having bits set to a value of "1" for memory blocks allocated to any processes of the multiprocess computer system. In response to the master MUDS, all memory blocks having a corresponding bit set to a value of "0" are returned to free memory. Each process may execute on a different processor in a multiprocess or computer system, for example on interface processors of a router. In a router the memory usage data structure is referred to as the Buffer Usage Data Structure (BUDS). The master BUDS is generated, and any processor not submitting a processor BUDS does not have any bits in the master BUDS set to a value of "1". Accordingly, any memory previously allocated to a processor which has crashed, or died, is then returned to the global free queue.

48 Claims, 15 Drawing Sheets

MEMORY BLOCKS
USAGE DIAGRAM

_US 6,757,803 B1_

DISTRIBUTED BUFFER RECOVERY

BACKGROUND OF THE INVENTION

1. Field of the Invention

This invention relates to recovery of memory in a computer system having a shared memory, the computer system being either a multiprocess or a multiprocess single processor system, and more particularly to avoiding loss of regions of memory by failure of a process to return allocated memory after finishing with it so that the region of memory can be de-allocated for re-use.

2. Background Information

Routers often have multiple processors handling incoming packets and outgoing packets. The packets are stored in buffers in common, or shared, memory. As the packet progress through steps of the routing procedure, ownership of the buffer in memory is transferred from processor to processor. Ownership of the buffer in memory is first assigned to a processor handling the incoming interface. Later, depending upon the system architecture, ownership of the buffer may be transferred to an intermediate processor. Still later, ownership may be transferred to a processor handling the outgoing interface. Upon transmission of the packet, the buffer in the common memory is released for re-use for routing another packet.

A problem in usage of buffers stored in common memory is that if an error occurs during the routing procedure, then the memory used for the buffer may not be released for re-use. Errors leading to a failure to release the memory used for buffers include: a crash of any of the processors to which ownership of the buffer may be assigned; a failure of the processor handling release of the memory for re-use; and other computer glitches, etc.

Also, a computer system having only one processor, but having an operating system which supports multiple processes using a shared memory has memory allocated to each process. When a process completes, the allocated memory is supposed to be de-allocated for re-use. However, computer glitches may cause memory to not be de-allocated. Memory which is not de-allocated is then lost and cannot be used by subsequent process. A method for de-allocating such lost memory is needed.

Memory which is not released for re-use is lost to the computer system. If enough memory is lost then the computer system will run out of memory and be unable to continue functioning. In the router example, bringing the router down and then re-booting it releases the lost memory. However bringing the router down and then re-booting it is very undesirable as it causes loss of service in the computer network served by the router. In the single processor system supporting multiple processes, the usual method of freeing the "lost" memory is to re-boot the system. Re-booting the computer system is very undesirable.

The memory management problem is discussed in the book by Andrew S. Tanenbaum and Albert S. Woodhull, _Operating Systems, Second Edition_, published by Prentice Hall, Copyright 1997, all disclosures of which are incorporated herein by reference, especially at pages 316–318.

A better way of releasing memory allocated to processors, or to multiple processes of a single processor, is needed.

SUMMARY OF THE INVENTION

A method of recovering memory blocks in a computer system having multiple processes executing therein, and the processes sharing a common memory, is described. A memory usage data structure (MUDS) is maintained for each process executing in the computer system. The MUDS has a bitmap field having a bit corresponding to each block of allocatable memory. A bit corresponding to a selected memory block is set to the value of "1" when the selected memory block is allocated to the selected process. The bit corresponding to the selected memory block is set to the value of "0" when the selected memory block is not allocated to the selected process. A master MUDS is generated by combining the MUDS maintained by each process, the master MUDS having bits set to a value of "0" for free memory blocks, and the master MUDS having bits set to a value of "1" for memory blocks allocated to any processes of the multiprocess computer system. In response to the master MUDS, all memory blocks having a corresponding bit set to a value of "0" are returned to free memory.

The processes may all execute on a single processor, or they may each execute on a single processor in a multiprocessor computer system. A master process may be used to combine all of the MUDS to form the master MUDS. The master MUDS may be formed by combining the individual process MUDS in response to expiration of a timer. Alternatively, the master MUDS may be formed by combining the individual process MUDS in response to a request by a process. When operating on a single processor, the multiple processes may execute under a timesharing operating system.

Each process may execute on a different processor in a multiprocessor computer system. The multiprocessor computer system may be a router where the individual processors are interface processors of the router.

When the multiprocessor computer system is a router the allocated memory may be buffer memory used to store data packets as they are being received and retransmitted. Allocation of the buffer memory to a receive queue is performed in order to maintain an empty receive queue ready to receive the next incoming data packet. Ownership of the buffer memory is transferred from a receiving processor to other processors as the routing process proceeds. Upon completion of routing of the data packet, the buffer memory is returned to the global free queue. The memory usage data structure is referred to, in the case of a router, as the Buffer Usage Data Structure, and is abbreviated BUDS. The master BUDS is generated, and any processor not submitting a processor BUDS does not have any bits in the master BUDS set to a value of "1". Accordingly, any memory previously allocated to a processor which has crashed, or died, is then returned to the global free queue in response to the master BUDS.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION OF AN ILLUSTRATIVE EMBODIMENT

Figure 1:
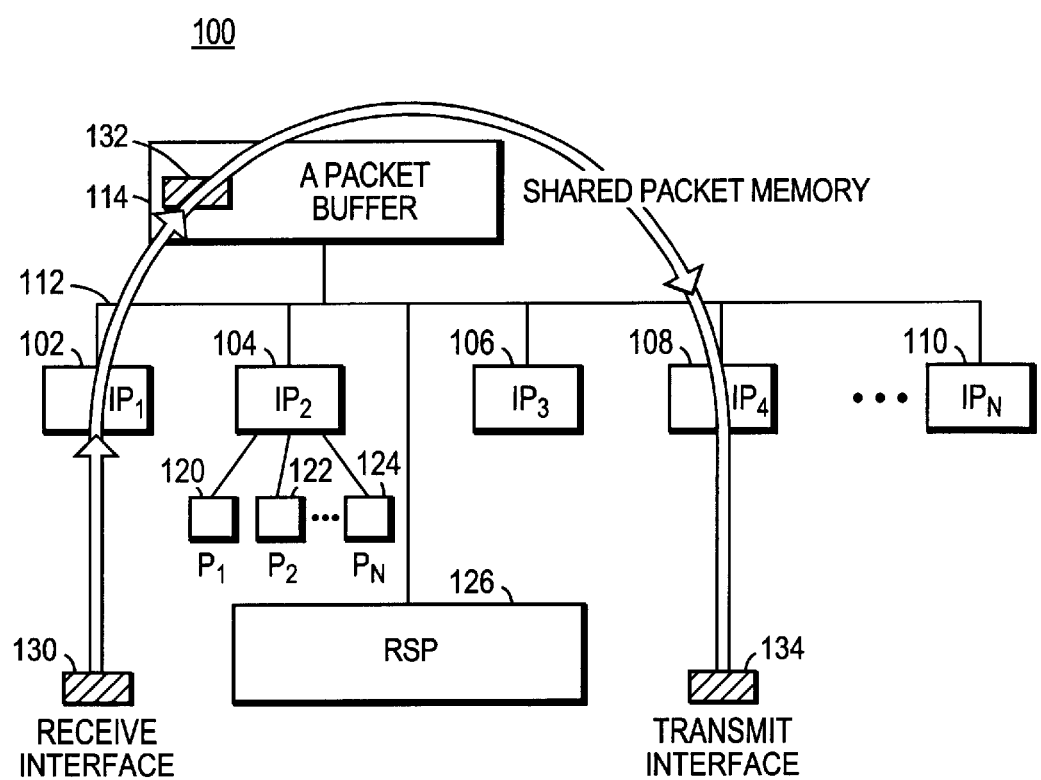
FIG. 1 is a block diagram of a multiprocessor computer system.

Turning now to FIG. 1., a multiprocessor computer system 100 is shown. In the following description, the exemplary embodiment of the invention wherein multiprocessor computer system 100 is a router or switch will be described.

Processors IP1 102, IP2 104, IP3 106, IP4 108, . . . IPN 110, etc. communicate through interconnect 112 with each other and with memory 114. The processor, in the router or switch example, are referred to as Interface Processors, or IP processors. Each Interface Processor handles multiple input/output interfaces (I/O interfaces). As an example, processor IP2 104 is shown handling I/O interfaces 120, 122, 124, etc. For example, each Interface Processor may, typically, handle as many as 10 to 100 I/O interfaces.

Routing Switch Processor (RSP) 126 is a main processor for the multiple IP processors 102, 104, 106, 108, 110 etc. The precise job of RSP 126 depends upon the system architecture of the multiprocessor system 100, and two examples for a router or switch will be given herein below.

In operation as a router or switch, multiprocessor system 100 receives an incoming packet at interface 130. IP1 102 is the Interface Processor handling interface 130. IPI 102, upon detection of the incoming packet, causes allocation of buffer 132 in shared memory 114 for storing the incoming packet. Processing of the packet by IP 1102 indicates that the output interface of the packet is to be interface 134, where output interface 134 is handled by IP4 108. At some point in time (not described herein) ownership of buffer 132 is shifted from IP1 102 to IP4 108. That is, ownership of buffer 132 is shifted from a receive queue maintained by IP1 102 to a transmit queue maintained by IP4 108. Transmission of the packet out of the router and onto a computer network link through transmit interface 134 then begins. Transmission of the packet out through transmit interface 134 may begin before the packet is completely received through receive interface 130, in which case the action is referred to as "cut through routing". Alternatively, multiprocessor 100 may completely receive the packet into buffer 132 before beginning transmission out through transmit interface 134, in which case the action is referred to as "store and forward routing". In any event, upon completion of transmission of the packet out through the transmit interface 134, the memory occupied by buffer 132 must be released, or de-allocated, for re-use when a subsequent packet is received by the multiprocessor system 100.

A computer error such as failure of the receiving processor IP1 102, failure of the transmitting processor IP4 108, failure of communication of the transfer of ownership of buffer 132 within multiprocessor 100, failure of main processor 126, etc., may result in the memory occupied by buffer 132 not being released or de-allocated. Failure to release or de-allocate the memory occupied by buffer 132 results in that memory being lost for use by a subsequent packet. After too much memory is lost, the multiprocessor system 100 fails to function properly. For example, there may not be enough usable memory left in memory 114 for the multiprocessor system to receive another packet for routing. Such a failure is called a "memory failure router crash". Other computer failures may also cause a router to crash, however a memory failure router crash occurs as buffer after buffer is lost to re-use as a result of failure to release or de-allocate the memory occupied by the buffer.

Figure 2:
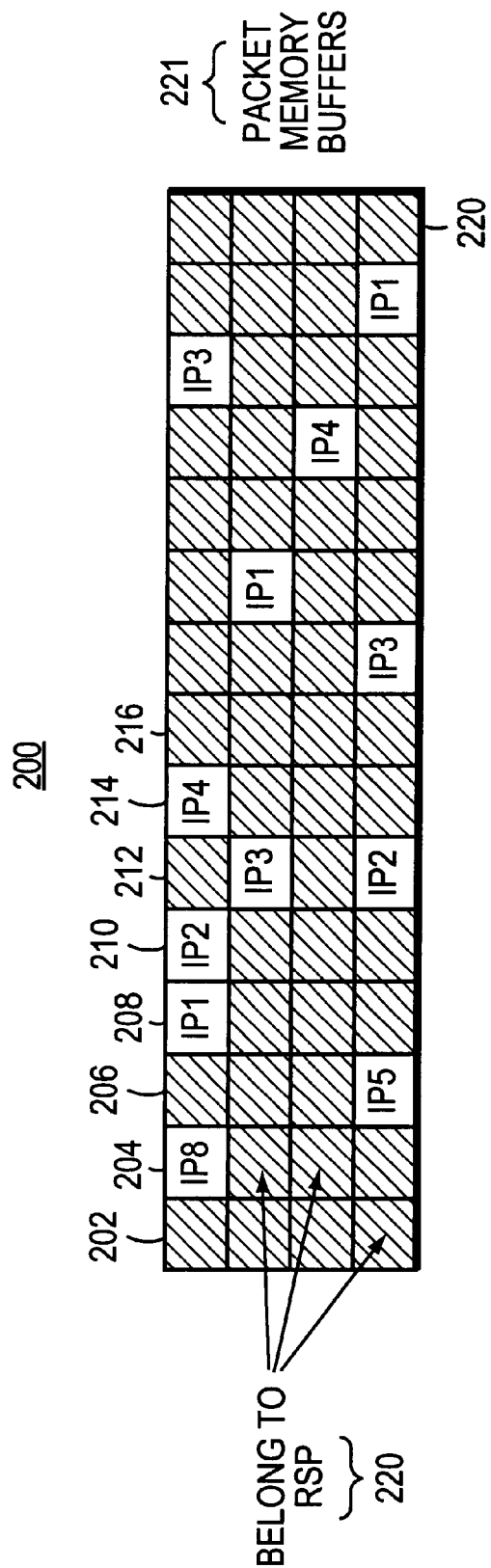
FIG. 2 is a block diagram of memory allocation.

Turning now to FIG. 2, buffer memory usage diagram 200 is shown. Memory is allocated for buffer use in blocks. In an exemplary embodiment of the invention, the allocated block size is 512 bytes. A block may be of a convenient size for a memory. For example, a block may be a single word of memory, or a block may be, for example, 128 words of memory. Or for example, a block may be 512 words of memory, etc. A word may be a single byte of memory, may be a two byte word, or a sixty four byte word, etc.

For example, memory blocks are indicated by blocks in FIG. 2, such as block 202, block 204, block 206, block 208, block 210, block 212, block 214, block 216, etc. For example, blocks belonging to the Global Queue of available memory are shown by cross hatching, and comprise in part block 202, block 206, block 212, block 216, etc. Blocks belonging to the Global Queue of available memory are said to be owned by RSP 126, and are so marked by legend 220. Blocks allocated to various Interface Processors are marked by the processor designation. For example, block 204 and block 208 are allocated to IP1 102. Block 210 is allocated to IP2 204. Block 214 is allocated to IP4 108, etc.

Figure 3:
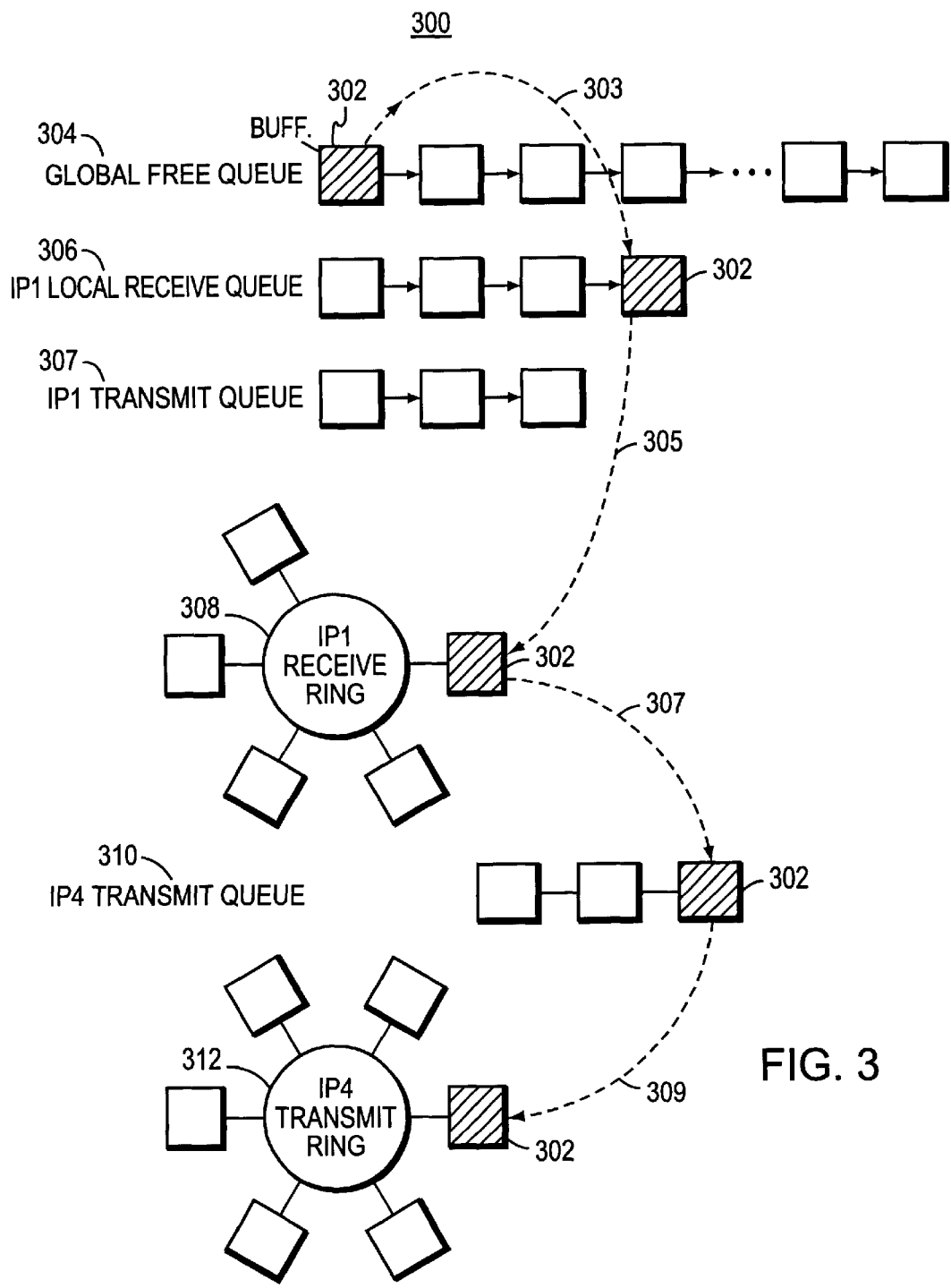
FIG. 3 is a block diagram of movement of ownership of buffer memory in a router.

Turning now to FIG. 3, allocation of memory blocks to queues of various Interface Processors is shown in queue diagram 300. Queue diagram 300 also shows shifts of ownership which occur as a packet is received at a receiving interface, stored in the buffer, and finally transmitted out of a transmitting interface. Buffer block 302 is first owned by RSP 126 in Global Queue 304. Upon detection of the incoming packet at a receive interface, for example receive interface 130, ownership of buffer block 302 is shifted along path 303 to a IP1 102 local receive queue 306. As processing of the incoming packet continues, ownership of buffer block 302 is shifted along path 305 to a receive ring buffer 308 of IP1 102. Receipt of the packet continues as ownership of buffer block 302 remains with receive ring 308 of IP1 102.

As processing continues, ownership of buffer block 302 will be shifted along path 307 to IP4 108 transmit queue 310, and then along path 309 to IP4 108 transmit ring 312. The packet is then transmitted through transmit interface 134 while ownership of buffer block 302 remains in IP4 transmit ring 312.

Upon completion of transmission of the packet by use of IP4 transmit ring 312, ownership of buffer block 132 is returned to the Global Free queue 304.

Figure 4:
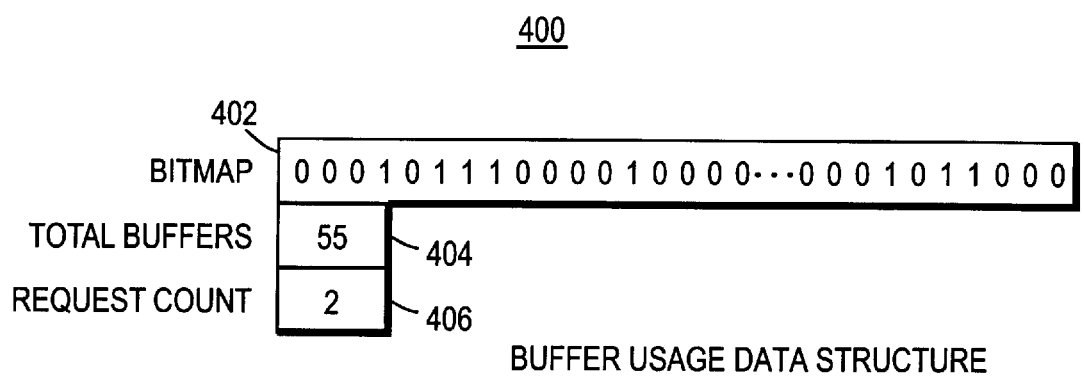
FIG. 4 is a block diagram of a memory allocation data structure in accordance with the invention.

Turning now to FIG. 4, buffer usage data structure 400 is shown. Buffer usage data structures 400 are used to manage ownership of buffer blocks, as will be explained more fully herein below. Each processor has a buffer usage data structure 400 assigned to it. For example, IP1 102 has a buffer usage data structure assigned to it; IP2 104 has a buffer usage data structure 400 assigned to it; . . . through IPN 110 which has a buffer usage data structure assigned to it, etc. Also, RSP 126, the Routing Switch Processor has at least one buffer usage data structure 400 assigned to it for management of the Global Free Queue 304 (referred to herein-below as the Master buffer usage data structure), and may have additional buffer usage data structures assigned to it for management of other queues, as may be required by the system architecture of multiprocessor computer system 100.

Buffer usage data structure 400 has three fields, first bitmap field 402 which contains a bit assigned to represent ownership of each buffer block 202, 204, 206, 208, 210, 212, 214, 216, etc., through the last buffer block 220; second, field 404 which contains a count of buffers whose ownership is indicated by buffer usage data structure 400; and third, a request count field 406. For example, in the event that there were 1024 buffer blocks represented by buffer memory usage diagram 200, then field 402 of buffer usage data structure 400 has 1024 bits, one bit to represent ownership of each buffer block.

When a buffer block is in the Global Free Queue, then the Master buffer usage data structure has its corresponding bit in bitmap field 402 set to "0", and when the buffer block is owned by any IP processor IP1 102, IP2 104, . . . IPN 110, etc. then the Master buffer usage data structure has its corresponding bit in bitmap field 402 set to "1".

When a buffer block is transferred from Global Free Queue 304 to an interface processor, that is any IP processor 102, 104, . . . 110, etc. then the corresponding bit in bitmap field 402 of that IP processor's buffer usage data structure 400 is set to "1", and the corresponding bit in the Master buffer usage data structure of RSP 126 is also set to "1". The value of "1" for a bit in bitmap field 402 is taken in this exemplary embodiment of the invention to indicate that the corresponding buffer block is owned by a processor, and has been removed from the Global Free Queue.

When ownership of the buffer block is shifted from a transferring processor to a receiving processor, then the processor transferring the buffer block clears its corresponding bit in bitmap field 402 to the value of "0" to indicate that it no longer owns the corresponding buffer block, and the receiving processor sets its corresponding bit in its bitmap field to "1" to indicate that it now has ownership of that buffer block.

For example, referring to FIG. 3, when buffer block 302 is owned by global free queue 304, then the bit corresponding to buffer block 302 in all of the buffer usage data structures in bitmap field 402 is set to "0". When ownership of buffer block 302 is shifted to local receive queue 306 of IP1 102 along path 303, then the corresponding bit in the IP1 102 buffer usage data structure in bitmap field 402 is set to the value of "1", and also the corresponding bit in bitmap field 402 of the Master buffer usage data structure 400 belonging to RSP 126 is set to a value of "1".

When ownership of buffer block 302 is shifted along path 307 to the IP4 108 transmit queue 310, the corresponding bit in the IP1 102 buffer usage data structure in bitmap field 402 is set to the value of "0", and the corresponding bit in the IP4 108 buffer usage data structure in bitmap field 402 is set to the value of "1" to indicate that IP4 108 now owns buffer block 302.

That is, the bit in bitmap field 402 of the buffer usage data structure 400 of the processor having ownership of a particular buffer block is set to a value of "1", and the corresponding bit of all processors not having ownership of that particular buffer block are set to "0". However, the Master buffer usage data structure owned by RSP 126 has a value of "1" entered for the corresponding buffer block to indicate that some IP processor owns the buffer block.

Figure 5:
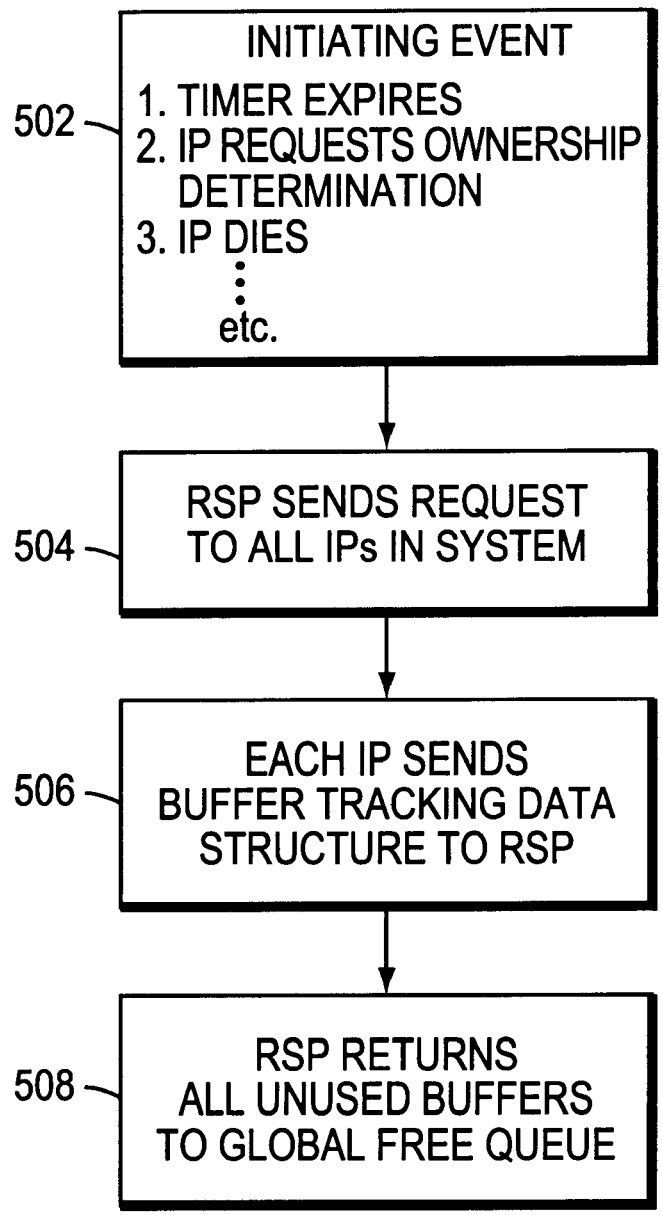
FIG. 5 is a flow diagram of an update process for memory block recovery in accordance with the invention.

Turning now to FIG. 5, a flow diagram of a process 500 to update the Master buffer usage data structure owned by RSP 126 is shown.

At block 502 an initiating event occurs to start the update process. The initiating event may be, for example: the expiration of a timer in RSP 126 indicating that it is time to do a periodic update of the Master buffer usage data structure; an IP processor 102, 104, . . . 110, etc. may request an update of the Master buffer usage data structure; the RSP may detect that an IP processor has crashed, or died, and in this event it is desirable to return all buffer blocks owned by the inoperative processor to the Global Free Queue, etc. Once an initiating event has been detected by RSP 126, then the process goes to block 504.

At block 504 process 500 executes in RSP 126, and sends Request messages to each of the IP processors 102, 104, . . . 110, etc. requesting that they send a copy of their buffer usage data structure 400 to RSP 126. Then process 500 goes to block 506.

At block 506 each IP processor determines the buffer blocks held in each of its queues and sets (value of 1) the bit corresponding to each buffer block in its buffer usage data structure 400. Bits representing buffer blocks not owned by the IP processor are cleared (set to 0). Then each IP processor sends a copy of its buffer usage data structure 400 to RSP 126. The process next goes to block 508.

At block 508 RSP 126 receives the copies of buffer usage data structure 400 from each IP processor. As copies of their buffer usage data structure 400 arrive at RSP 126, then RSP 126 logically combines the IP processor copies to generate a new Master buffer usage data structure 400. In creating the new Master buffer usage data structure 400, first all bits in its bitmap field 402 are set to a value of "0". Then, the logical combination of the first arriving IP processor message containing buffer usage data structure 400 places values of "1" in the bit positions of bitmap field 402 of the Master buffer usage data structure corresponding to buffer blocks owned by that IP processor. The second arriving message sets corresponding bits of the Master buffer usage data structure 400 to "1", in the bitmap fields owned by the processor returning the second received Message, etc. After all of the messages are received from IP processors, the Master buffer usage data structure 400 has "0" values for all unused buffer blocks, and values of "1" for all buffer blocks currently owned by any IP processor.

All blocks having a "0" in their corresponding bit in the master buffer usage data structure are then returned to the Global Free Queue.

RSP 126 also has a timer which expires at a fixed time after transmission of the Request message to all of the IP processors. Any IP processor not responding by expiration of the timer is counted as inoperative. Since that IP processor not responding to the Request did not submit any bits in bitmap field 402 having a value of "1", then all of the buffer blocks owned by that non-responding IP processor are set to a value of "0" in the Master buffer usage data structure 400, and so are assigned to the Global Free Queue for re-use.

It may occur that a second request message is transmitted by RSP 126 before all response are received from a previous request. In order that RSP 126 distinguish requests and the responses directed to that request, a request count field 406 is included in all of the buffer usage data structures. When a Request is sent by RSP 126, a count field has a number written therein. The IP processors copy this request count number and write it into their buffer usage data structure at request count field 406. Then RSP 126 can read request count field 406 in returning messages and sort the returning messages as responses to the correct Request message.

Total buffers field 404 in the buffer usage data structure contains the number of buffers owned by that IP processor. That is, the number written into total buffers field 404 should equal the number of bits set to a value of "1" in that buffer usage data structure. This field can be used to detect errors in transmission and handling of the plurality of buffer usage data structures contained in messages sent by the IP processors to RSP 126. Also, the numbers in total buffers field 404 may be summed over the arriving messages in response to a Request, and the sum give the total number of buffer blocks committed in memory 114 at the time that the various Response messages were generated. Further, the sum should equal the number of bits set to a value of "1" in the Master buffer usage data structure.

Figure 6:
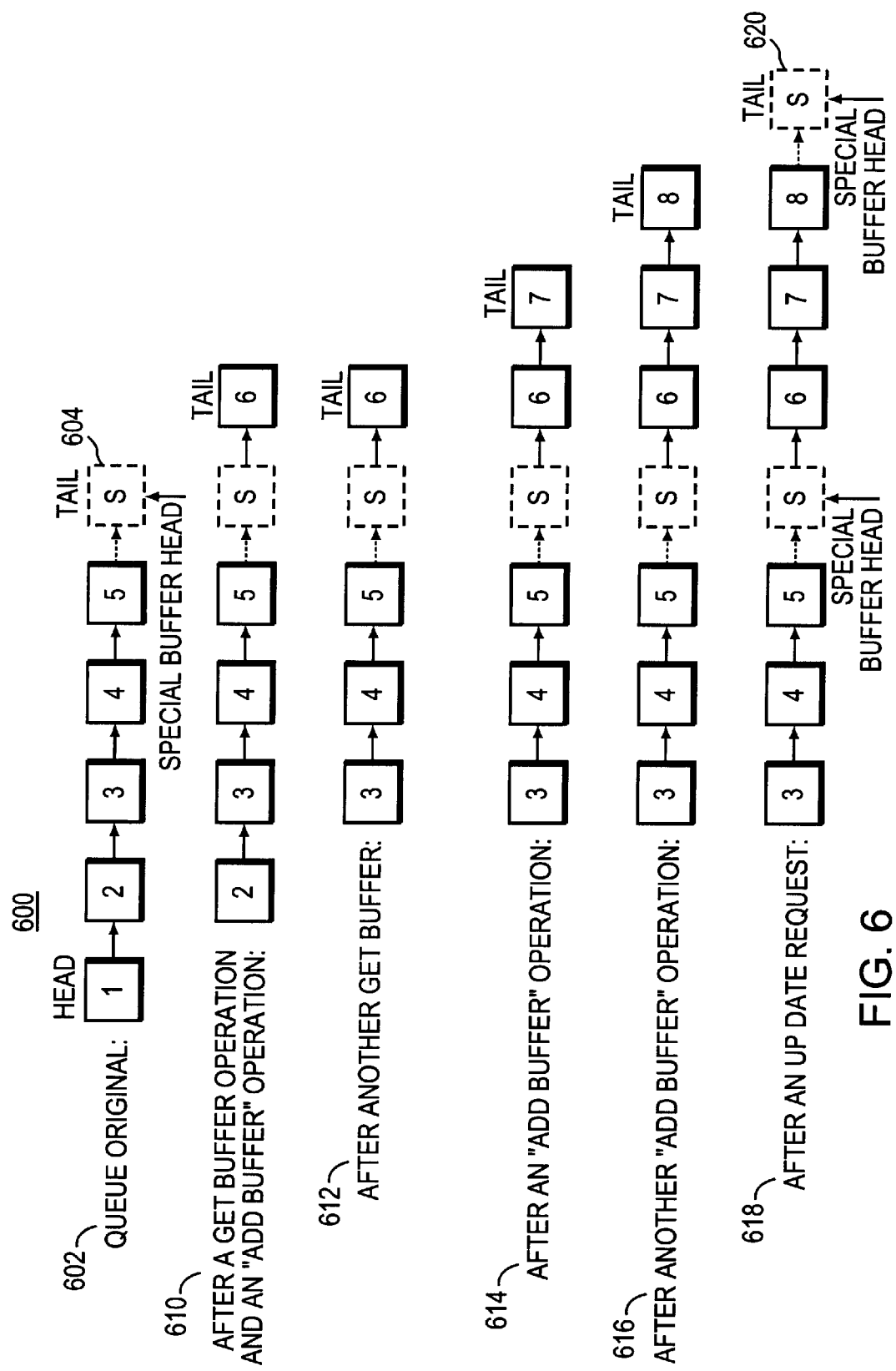
FIG. 6 is a block diagram of a buffer in accordance with the invention.

Turning now to FIG. 6, a sequence of block diagrams 600 of an IP processor buffer queue is shown. The sequence of block diagrams 600 show buffer blocks that are dynamically removed by a "get buffer" operation, dynamically added by an "add buffer" operation, and also show the dynamic addition of a "special buffer header" to delimit the end of a queue when an up-date request for the Master buffer usage data structure is received by the IP processor from RSP 126. All of the buffer blocks in the sequence of block diagrams 600 are owned by a particular IP processor.

In sequence 602 buffer block 1 is at the head of the queue and buffer blocks 2, 3, 4, and 5 are in the queue. A special buffer header 604 marks the tail of the queue. Special buffer header 604 was added to the queue by the owning IP processor in response to receipt by the owning IP processor of a Request message for an update from the buffer usage data structure maintained by that IP processor. The IP processor then determines which buffer blocks are in queue 602 and sets the corresponding bits of its buffer usage data structure 400 to the value of "1". The special buffer header is necessary because the length of queue 602 may change by the addition of another buffer before the IP processor can finish determining which buffers are in its queue. That is, a race condition exists between the determination of the queue length and the addition of another buffer block. The special buffer header 604 delimits the length of the queue 602 as it existed at the time that the Request message was received from the RSP processor 126, and it is this length which is reported by the owning IP processor in response to the Request message.

As an example of dynamic changes in buffer length, queue 610 shows buffer block 1 removed by a "get buffer" operation, and shows buffer block 6 added at the tail of the queue by an "add buffer" operation. Queue 612 shows buffer block 2 removed by another "get buffer" operation. Queue 614 shows the queue after addition of buffer block 7 at the tail of the queue by another "add buffer" operation. Queue 616 shows the queue after addition of buffer block 8 at the tail of the queue by another "add buffer" operation. Queue 618 shows the queue after another Request message is received by the owning IP processor from the RSP processor 126, and special buffer header 620 has been added to delimit the tail of the queue. The buffer usage data structure 400 which the owning IP processor sends to the requesting IP processor 126 in response to the Request message will have bits sets indicating that buffer blocks 3, 4, 5, 6, 7, and 8 are owned by the IP processor. The use of the special buffer headers 604, 620 permits the owning IP processor to solve the dynamic problem of locating the tail of the queue when a Request message is received from RSP processor 126. That is, if another buffer is added to the queue after receipt by the owning IP processor of another Request message, the queue which is reported to the RSP processor 126 ends at buffer block 8, in response to the special buffer header 620 added when the Request message was received.

Figure 7:
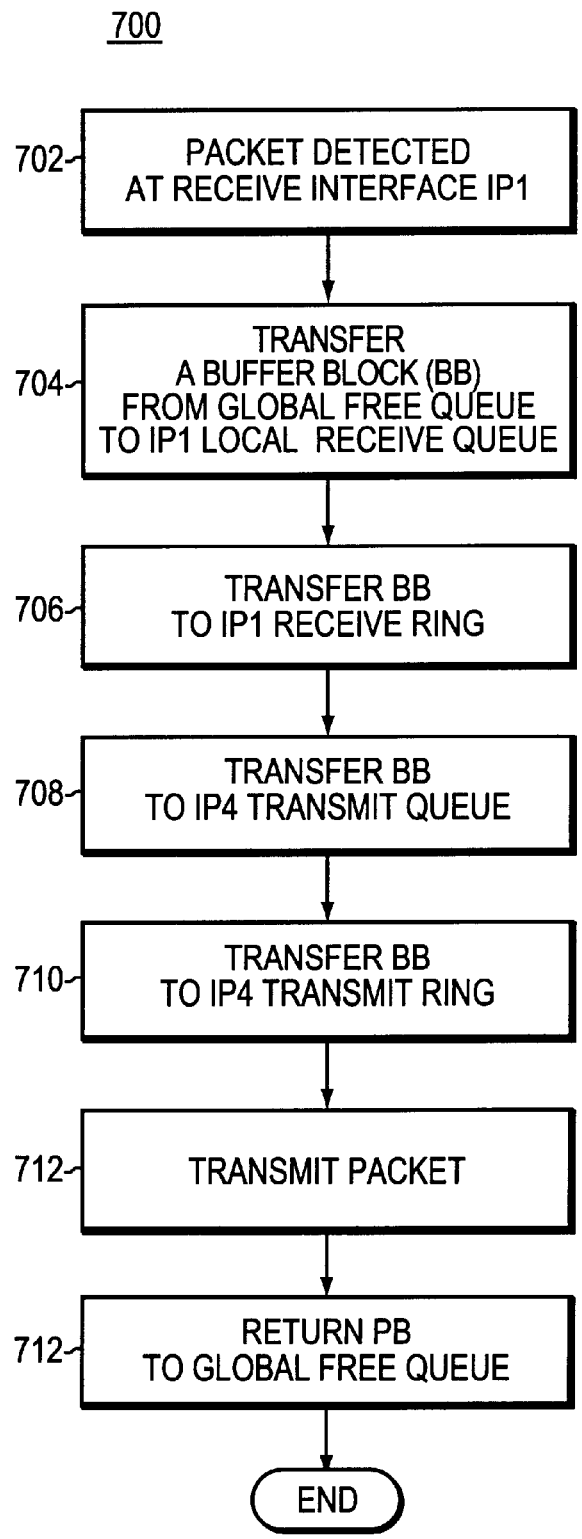
FIG. 7 is a flow diagram of an alternative transfer of buffer ownership in a router in accordance with the invention.

Turning now to FIG. 7, a flow diagram 700 of a process is shown. Flow diagram 700 illustrates the changes of ownership of a buffer block as a packet is received and then transmitted by a router having the multiprocessor architecture of FIG. 1. At block 702 the arrival of a packet is detected at an interface of Interface Processor IP1 102. The process 700 then goes to block 704.

At block 704 a buffer block 132 is transferred from the Global Free Queue 304 to the local receive queue 306 of IP1 102. The process 700 then goes to block 706.

At block 706 the buffer block 132 is transferred to the IP1 102 receive ring 308. However, ownership of the buffer block 132 remains with IP1 102. The incoming packet is then received through operation of IP1 receive ring 308. The process 700 then goes to block 708.

At block 708 the buffer block is transferred to IP4 108 transmit queue 310. Ownership of buffer block 132 is transferred to IP4 108. Process 700 then goes to block 710.

At block 710 buffer block 132 is transferred to IP4 transmit ring 312. Ownership of buffer block 132 remains with IP4 108. The process 700 then goes to block 712.

At block 712 the contents of the buffer block are transmitted out to a computer network connection through interface 134. Upon completion of transmission of the contents of buffer block 132, process 700 goes to block 714.

At block 714 the buffer block 132 is returned to the Global Free Queue 304, and ownership of the buffer block 132 is transferred to the processor of RSP 126. Process 700 then goes to block 716 where it ends. Process 700 will start again upon detection of another incoming packet at an interface.

Figure 8:
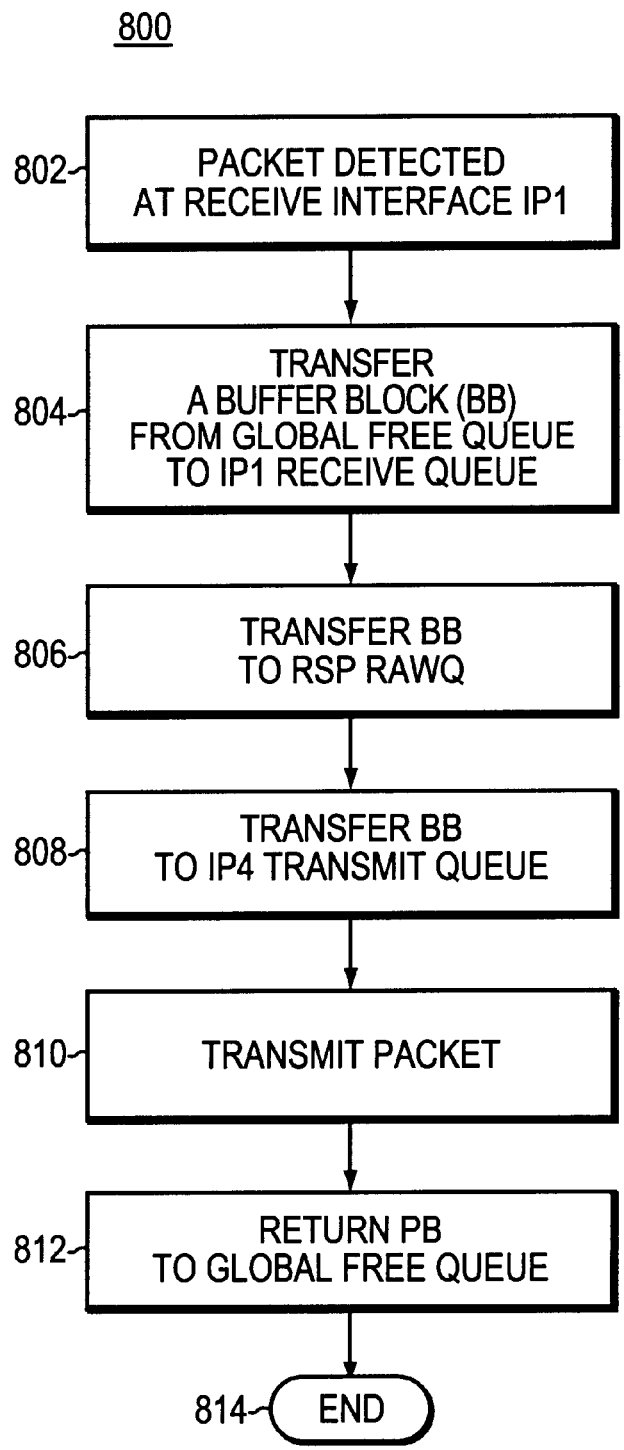
FIG. 8 is a flow diagram of an alternative transfer of buffer ownership in a router in accordance with the invention.

Turning now to FIG. 8, an alternate exemplary embodiment of the invention is shown in the flow chart of process 800. In the flow chart of process 700 the IP processors were assumed to have considerable processing ability. In contrast, the processors used in the IP processors are assumed to have less processing ability.

At block 802 an incoming packet is detected at an interface of IP1 102. Process 800 then goes to block 804.

At block 804 ownership of a buffer block, for example buffer block 132, is transferred from the global free queue to IP1 102. Process 800 then goes to block 806.

At block 806 ownership of the buffer block 132 is transferred to the processor in RSP 126 and placed on the raw queue (RAW Q) of RSP 126. Further processing of the incoming packet occurs with the buffer block owned by RSP 126 and on the RAW Q. is The process 800 then goes to block 808.

At block 808 ownership of buffer block is transferred to IP4 108 transmit queue. Process 800 then goes to block 810.

At block 810 the packet is transmitted from an interface 134 managed by IP4 108. After transmission of the contents of buffer block 132 is completed, process 800 goes to block 812.

At block 812 the buffer block is returned to the Global Free Queue 304. Process 800 then goes to block 814 where process 800 ends. Upon the detection of another incoming packet, process 800 will be started at block 802 in order to handle reception and transmission of the packet.

Multiprocess Embodiment of the Invention

Typically, a computer's operating system is in charge of general purpose memory allocation in response to client processes executing "malloc" and "free" commands. The operating system also keeps track of the memory usage for each client. Examples of memory system allocation and de-allocation are given in the book by Tanenbaum and Woodhull, *Operating Systems, Second Edition*, as mentioned hereinabove. However, the present invention offers advantages in providing a method for recapturing memory regions lost by ordinary memory management processes.

Figure 9:
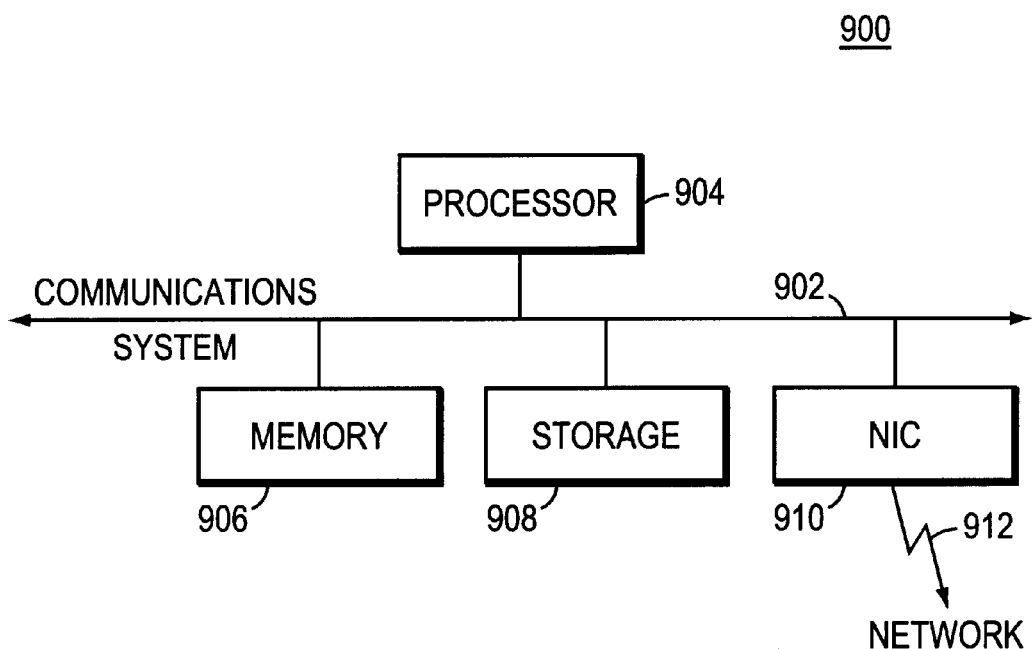
FIG. 9 is a block diagram of a computer system.

Turning now to FIG. 9, a multiprocess computer system 900 is shown. Multiprocess computer system 900 has a communication system 902 connected to the processing elements of computer system 900. Processor 904 couples to communication system 902. Memory 906 couples to communication system 902. Storage system 908, which may be disk storage, off site storage, etc. couples to communication system 902. Network interface card (NIC) 910 couples to communication system 902. Also, computer network 912 couples to network interface card 910.

Processor 904 executes instructions stored in memory 906, and works on data also stored in memory 906. Memory 906 is shared memory, in that blocks of memory 906 are allocated to process executing on processor 904, and the allocated blocks should be de-allocated when a process either finishes with the allocated region, or the process terminates, etc.

Storage system 908 serves as a bulk storage element and may be either a disk mounted in the cabinet of computer system 900, or may be a remote storage system for example, a storage system on a server that provides remote data storage.

Network interface card 910 provides communication between computer system 900 and a computer network 912 for ordinary computer network transactions. For example, a copy of a computer program capable of executing the present invention may be downloaded from the network 912 to computer system 900 through NIC card 910.

Communication system 902 may be a computer bus, may be a switch for switched computer systems, or may be any other type of communications system useful in an ordinary computer system 900.

Figure 10:
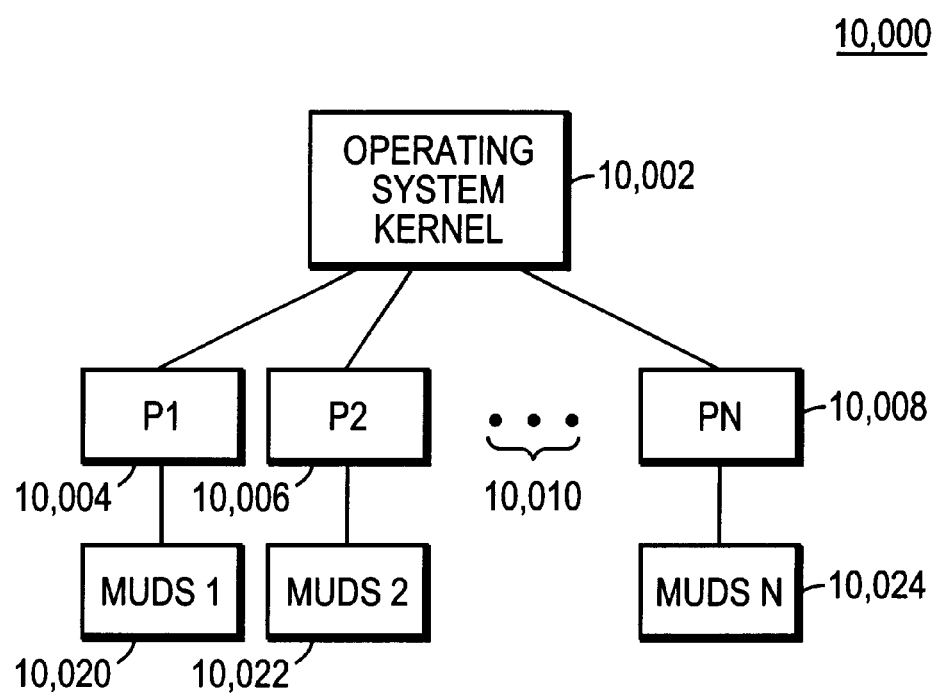
FIG. 10 is a block diagram of an operating system in accordance with the invention.

Turning now to FIG. 10, operating systems 10,000 is shown. Operating system 10,000 executes on computer system 900 to provide operating system services.

Operating system 10,000 comprises an operating system kernel 10,002. Operating system kernel 10,002 supports a plurality of processes executing independently on computer system 900. That is, operating systems 10,000 is a multi-processing operating system.

Process 10,004, that is process PI, executes under the control of operating system kernel 10,002.

Process 10,006, that is process P2, also executes on computer system 900 under the control of operating system kernel 10,002. Likewise, many independent processes are supported by operating system kernel 10,002. For example, process PN 10,008 indicates, along with three dots 10,010 indicates that a large number of independent processes may execute on computer system 900 independently of each other, and under the control of operating system kernel 10,002. For example, processes P1, P2 . . . PN may time-share processor 904.

Figure 11:
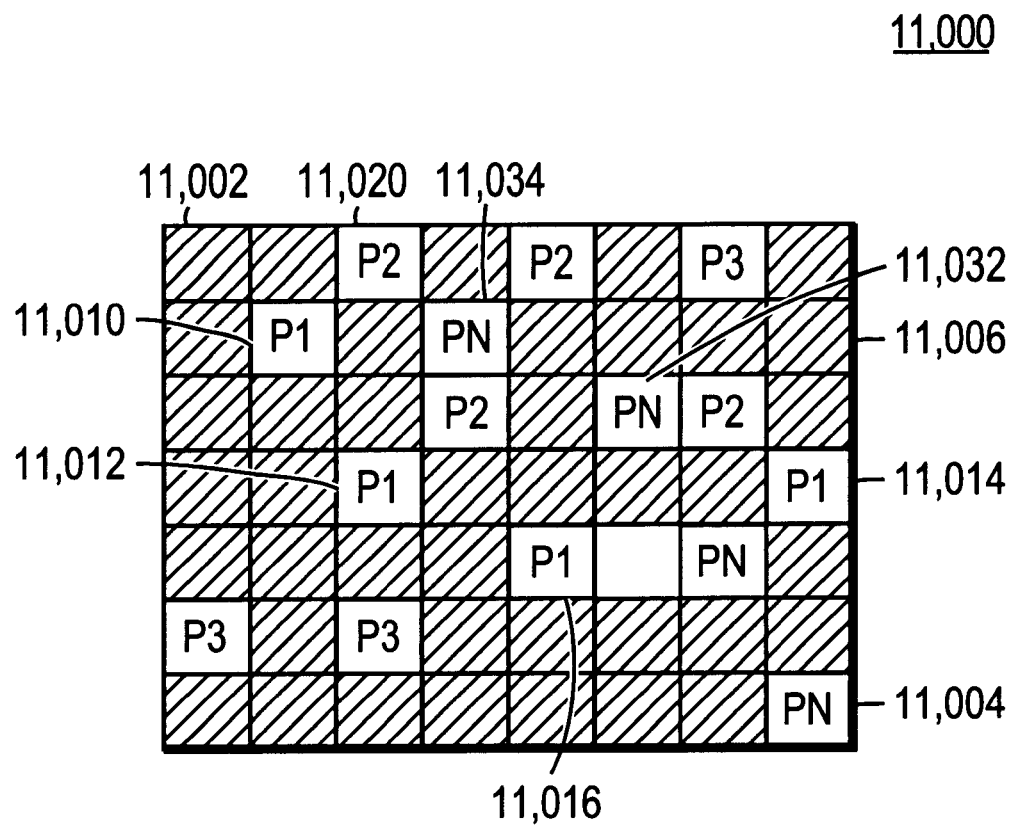
FIG. 11 is a memory blocks usage diagram in accordance with the invention.

In accordance with the present invention, memory 906 is divided into blocks, as shown in FIG. 11. Each block of memory 906 is either in "free memory" or is assigned or allocated to a particular process.

Turning now to FIG. 11, memory allocation by blocks is shown in memory blocks usage diagram 11,000.

For example, block 11,002 is an independently allocable block of memory 906. Also, all of the blocks indicated in memory blocks usage diagram 11,000, for example from block 11,002 through block 11,004 are allocable blocks of memory 906. A block may be of a convenient size for a memory. For example, a block may be a single word of memory, or a block may be, for example, 128 words of memory. Or for example, a block may be 512 words of memory, etc. A word may be a single byte of memory, may be a two byte word, or a sixty four byte word, etc.

The blocks of memory are allocated to processes by the operating system 10,000. Before a block of memory is allocated to a process it is in "free memory". After a process is finished with a block of memory, that block of memory is returned to "free memory" so that it may be allocated to another process. For example, the cross hatched blocks in memory block usage diagram 11,000 such as block 11,006 is in free memory, as are all of the other cross hatched memory blocks shown in FIG. 11.

A block of memory allocated to a process is shown with that process indication written in the block, for example block 11,010 is allocated to process P1 10,004, as is also block 11,012, block 11,014, and block 11,016, etc. Blocks allocated to process P2 10,006 are indicated with a P2 written in the corresponding block of FIG. 11, for example, block 11,020. Blocks allocated to process PN are indicated by that symbol being written into the blocks of FIG. 11, for example, block 11,004, block 11,032, block 11,034, etc.

Figure 12:
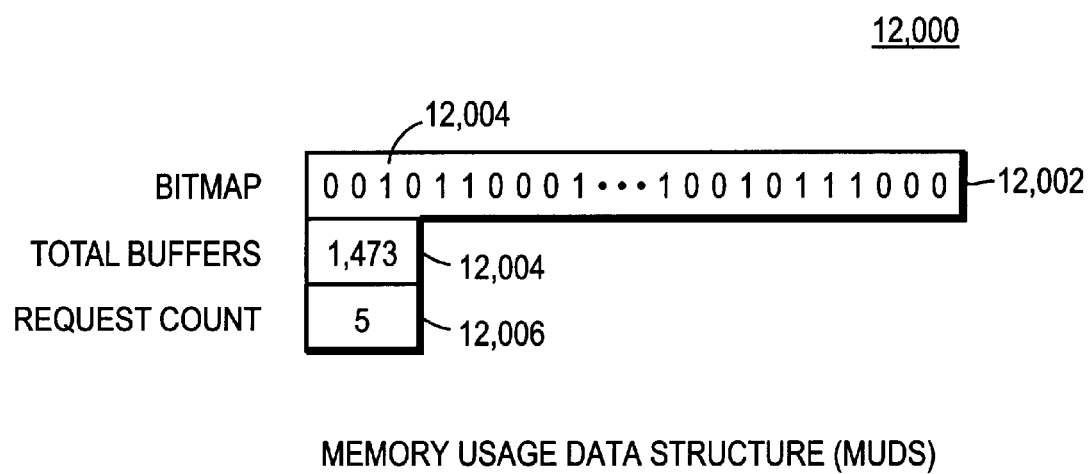
FIG. 12 is a block diagram of a memory usage data structure (MUDS) in accordance with the invention.

Turning now to FIG. 12, a Memory Usage Data Structure (MUDS) 12,000 is shown. MUDS 12,000 has a bitmap 12,002, a field for total buffers 12,004, and field for request count 12,006.

Bitmap field 12,002 contains a bit for each block of allocable memory from memory 906, as shown in memory blocks usage diagram 11,000. The position of the bit is related to the designated block of memory 906. A bit in bitmap 12,002 is set to "0" if the block is in free memory. The bit in bitmap 12,002 is set to "1" if the corresponding block is allocated to a process.

Returning to FIG. 10, process P1 has a MUDS1 10,020 maintained by the operating system 10,000.

Process P2 10,006 has a MUDS2 10,022 maintained by the operating system 10,000. Also, each process spawned and served by operating system kernel 10,002 has a corresponding MUDS.

For example, process PN 10,008 has MUDS N 10,024 to maintain the memory usage data structure 12,000 for memory allocated to that process.

Accordingly, each process has a memory usage data structure 12,000 maintained by the operating system to indicate the blocks of memory allocated to that process.

Figure 13:
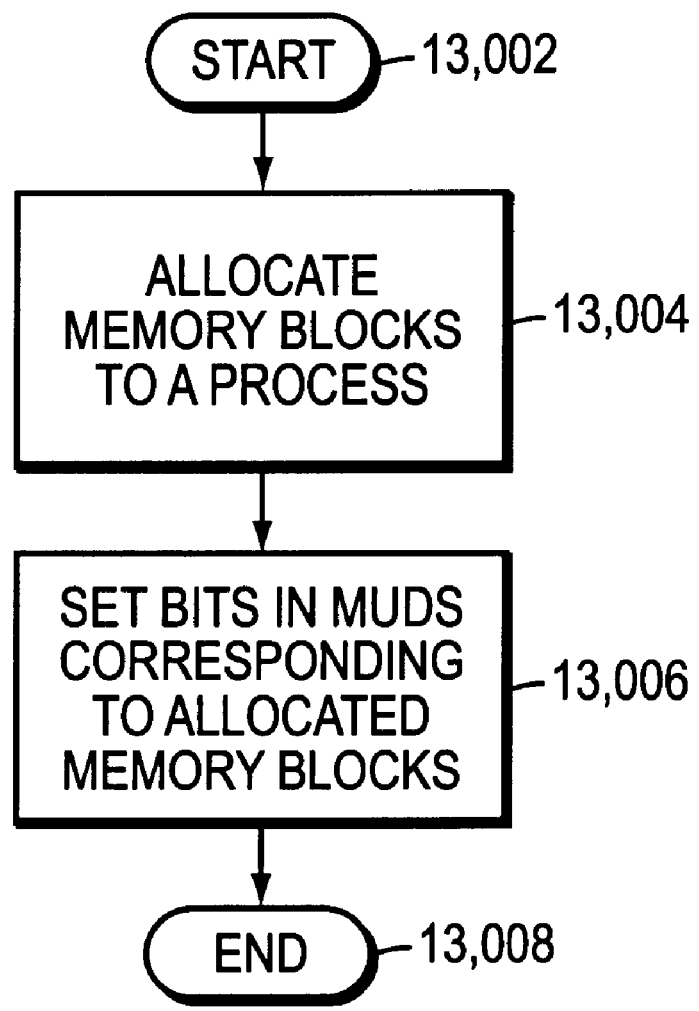
FIG. 13 is a flow diagram of a memory allocation process in accordance with the invention.

Turning now to FIG. 13, a flow diagram 13,000 is shown for the allocation of a block of memory to a process. The process 13,000 maybe invoked by a memory allocation call in a computer program executing as a process P1, P2, . . . , PN in processor 904. For example, an "ALLOC" system command may initiate execution of process 13,000.

Process 13,000 starts at block 13,002 and goes to block 13,004.

At block 13,004 the process 13,000 allocates memory blocks in accordance with the mechanisms standard in operating systems as they are currently known. Upon completion of block 13,004 the process goes to block 13,006.

At block 13,006 the process sets a bit in Memory Usage Data Structure 12,000 corresponding to each block of memory allocated to the process at block 13,004. For example, if the block of memory corresponding to bit 12,002 were allocated to a process at block 13,004, then that bit 12,004 is set to a value of "1" at block 13,006. In the event that more than one block of memory is allocated to a process at block 13,004, then at block 13,006 each of the corresponding bits in Memory Usage Data Structure 12,000 is set to a value of "1" at block 13,006. Upon completion of block 13,006 the process goes to block 13,008.

At block 13,008 the process 13,000 ends.

Figure 14:
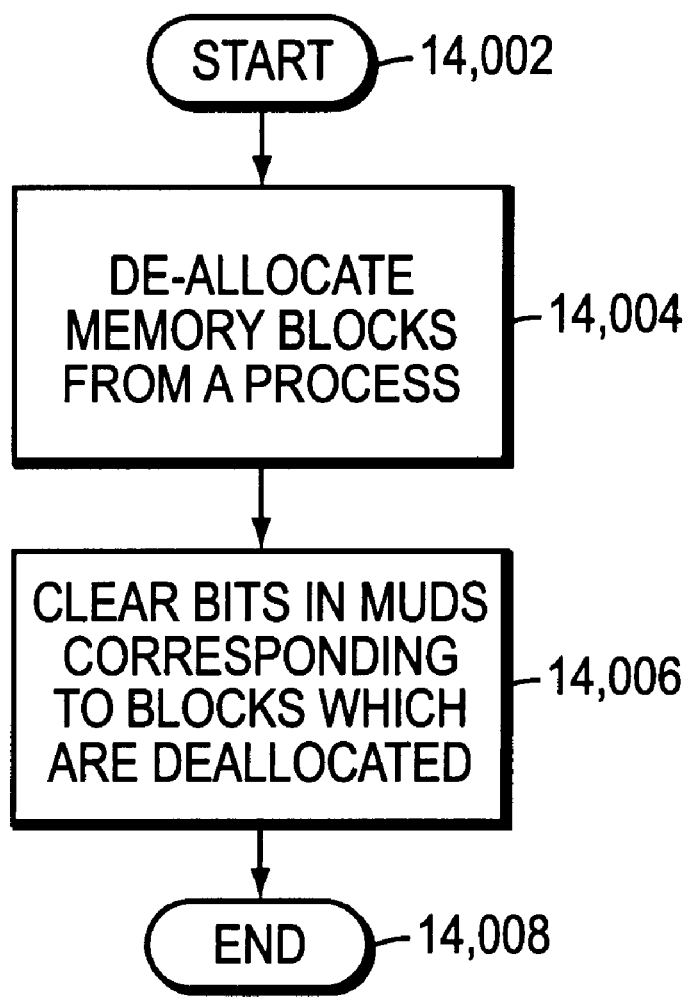
FIG. 14 is a flow diagram of a memory de-allocation process in accordance with the invention.

Turning now to FIG. 14, a memory de-allocation process is shown. At block 14,002 the process starts. The process ordinarily starts upon execution of an instruction in a computer program executing in a process, where the instruction de-allocates blocks of memory. From the start block 14,002 the process goes to block 14,004.

At block 14,004 the block of memory is de-allocated in accordance with the ordinary and usual methods of de-allocation of memory by a process. Upon completion of deallocation of the indicated blocks of memory at block 14,004, the process goes to block 14,006.

At block 14,006 the process clears bits by setting them to a value "0" in Memory Usage Data Structure 12,000. A block of memory which is de-allocated in block 14,004, accordingly, has its corresponding bit in bitmap 12,000 set to a value of "0". Upon completion of block 14,006 for each block of memory de-allocated, the process goes to block 14,008.

At block 14,008 the process 14,000 ends.

Figure 15:
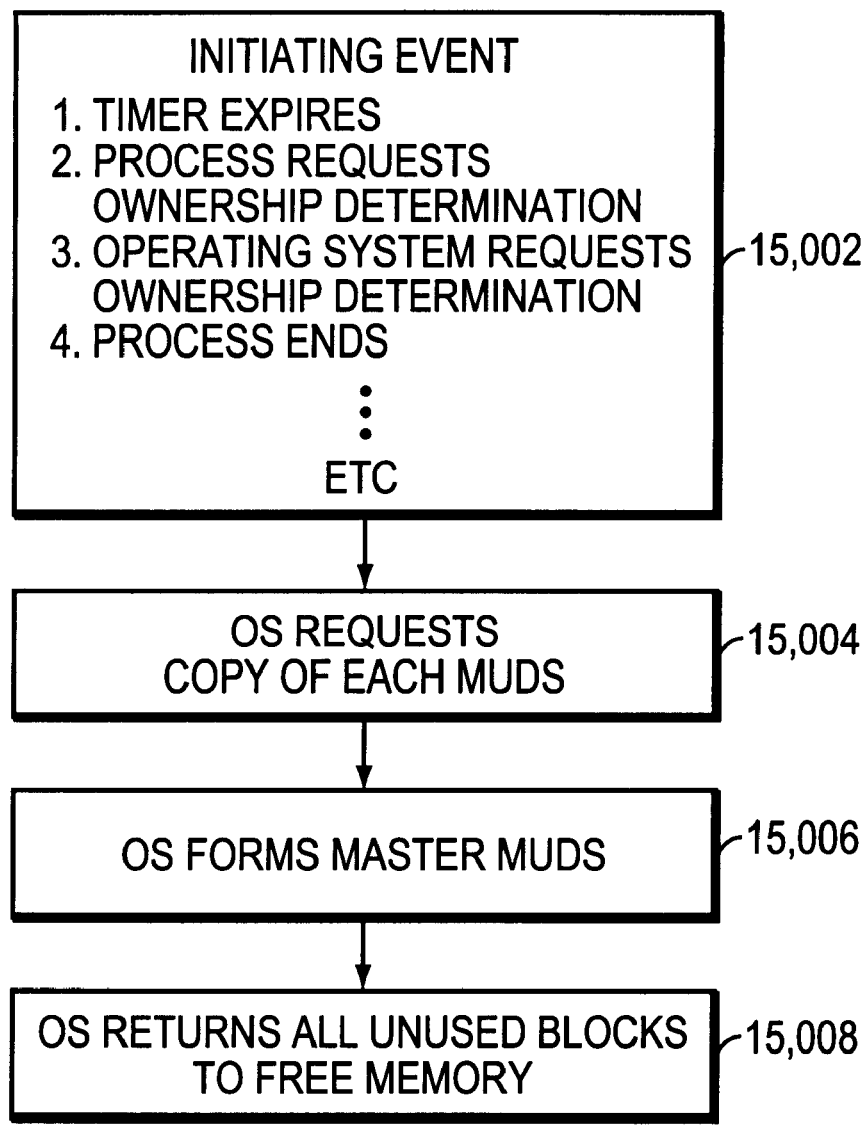
FIG. 15 is a flow diagram of an update process for memory block recovery in accordance with the invention.

Turning now to FIG. 15, an update process 15,000 by the operating system for a aster buffer usage data structure is shown. At block 15,002 an initiating event occurs. For example, an initiating event may be: (1) the expiration of a timer; (2) a process executing under operating system 10,000 may request a memory block ownership determination; (3) the operating system kernel 10,002 may request an ownership determination of blocks in its memory; (4) a process, such as process P1 10,004, P2 10,006, PN 10,008, etc. may end. Other initiating events may occur, as indicated by the three dots followed by "etc." in block 15,002. Upon completion of block 15,002 the initiating event to start execution of process 15,000, the process goes to block 15,004.

At block 15,004 the operating system 10,000 requests a copy of each MUDS 12,000 maintained by each process. That is, the operating system kernel 10,002 reads a copy of each MUDS maintained by each process, for example MUDS 1, 10,020; or MUDS 2, 10,022; or MUDS N, 10,224; . . . , etc. Upon completion of block 15,004 the process goes to block 15,006.

At block 15,006 the operating system 10,000, for example the operating system kernel 10,002, forms a master MUDS. The master MUDS is formed by logically combining the bitmaps 12,002 of each MUDS maintained by the processes executing at the time of the initiating event. A logical OR operation on the various bitmaps 12,000 of the various processes produces a bitmap that has ones in all locations corresponding to allocated memory blocks and has zeroes at bit positions corresponding to all memory blocks which are not currently allocated.

In the event that a process terminates without de-allocating its memory blocks, the process will not have a MUDS at the time that the initiating event at block 15,002 occurs. The absence of the process, and its corresponding MUDS, at the time at which the initiating event 15,002 occurs results in no MUDS for that process being logically combined at block 15,006 into the master MUDS. That is, any allocated memory block which was not properly de-allocated will have the master MUDS generated at block 15,006 have its corresponding bit set to a value of "0".

Accordingly, all memory blocks which are not currently in use as allocated memory blocks will have their corresponding bit in the master MUDS set to a value of "0". Upon completion of block 15,006 the process goes to block 15,008.

At block 15,008 the operating system 10,000, for example the operating system kernel 10,002, returns all blocks having their corresponding bit set to a value of "0" in the master MUDS generated at block 15,006 returned to free memory. Upon being returned to free memory, all free memory blocks are again available for allocation to another process.

Accordingly, update process 15,000 scavenges, or performs "garbage collection" on memory blocks which would otherwise be lost from free memory by "memory leakage". That is, the update process 15,000 garbage collects all memory blocks which are not currently in use by a process as an allocated block of memory, and returns the collected blocks to free memory.

It is to be understood that the above described embodiments are simply illustrative of the principles of the invention. Various other modifications and changes may be made by those skilled in the art which embody the principles of the invention and fall within the spirit and scope thereof.

What is claimed is:

1. A method of recovering memory blocks in a computer system having multiple processes executing therein, said processes sharing a common memory, comprising:

maintaining a memory usage data structure (MUDS) for each process executing in said computer system, said MUDS having a bitmap field having a bit corresponding to each block of allocatable memory;

setting a bit corresponding to a selected memory block to the value of "1" when said selected memory block is allocated to said selected process;

setting said bit corresponding to said selected memory block to the value of "0" when said selected memory block is not allocated to said selected process; and, combining said MUDS maintained by said each process to generate a master MUDS, said master MUDS having bits set to a value of "0" for free memory blocks, and said master MUDS having bits set to a value of "1" for memory blocks allocated to any processes of said multiprocess computer system.

2. The method of claim 1 further comprising:

transferring all memory blocks having their corresponding bit in said master MUDS set to a value of 0 to free memory.

3. The method of claim 1 further comprising:

executing said multiple processes on a processor in said computer system.

4. The method of claim 1 further comprising:

combining said MUDS, maintained by said each process, by a master process to generate said master MUDS.

5. The method of claim 1 further comprising:

performing said combining step in response to expiration of a timer.

6. The method of claim 1 further comprising:
performing said combining step in response to a request generated by a processor.

7. The method of claim 1, further comprising:
executing a multiprocess operating system on a processor in said computer system, said multiple processes executing by timesharing under said multiprocess operating system.

8. The method of claim 1 further comprising:
executing each process of said multiple processes on a different processor in said computer system, said computer system being a multiprocessor computer system.

9. A method of recovering memory blocks in a computer system having multiple processes executing therein, said processes sharing a common memory, comprising:
maintaining a memory usage data structure (MUDS) for each process executing in said computer system, said MUDS having a bitmap field having a bit corresponding to each block of allocatable memory;
setting a bit corresponding to a selected memory block to the value of "1" when said selected memory block is allocated to said selected process;
setting said bit corresponding to said selected memory block to the value of "0" when said selected memory block is not allocated to said selected process;
combining said MUDS maintained by said each process to generate a master MUDS, said master MUDS having bits set to a value of "0" for free memory blocks, and said master MUDS having bits set to a value of "1" for memory blocks allocated to any processes of said multiprocess computer system;
executing each process of said multiple processes on a different processor in said computer system, said computer system being a multiprocessor computer system; and,
selecting said multiprocessor computer system as a router, wherein said each processor further comprises interface processors.

10. A computer system having multiple processes executing therein, said processes sharing a common memory, comprising:
a memory usage data structure (MUDS) for each process executing in said computer system, said MUDS having a bitmap field having a bit corresponding to each block of allocatable memory;
when an elected memory block is allocated to a selected process, setting, in a MUDS of said selected process, a bit corresponding to said selected memory block to the value of "1";
when a memory block is not allocated to any process, setting, in said MUDS of said selected process, a bit corresponding to said memory block to the value of "0"; and,
a master MUDS made by combining said MUDS maintained by said each process, said master MUDS having bits set to a value of "0" for free memory blocks, and said master MUDS having bits set to a value of "1" for memory blocks allocated to all processes of said multiprocess computer system.

11. The apparatus as in claim 10 further comprising:
a free memory, wherein all memory blocks having their corresponding bit in said master MUDS set to a value of 0 are transferred to said free memory.

12. The apparatus as in claim 10 further comprising:
a processor in said computer system, said multiple processes executing on said processor.

13. The apparatus as in claim 10 further comprising:
a master process to generate said master MUDS by combining said MUDS maintained by said each process.

14. The apparatus as in claim 10 further comprising:
a timer, said combining step performed in response to expiration of said timer.

15. The apparatus as in claim 10 further comprising:
a request generated by a processor, said combining step performed in response to said request.

16. The apparatus as in claim 10 further comprising:
a multiprocess operating system executing on a processor in said computer system, said multiple processes executing by timesharing under said multiprocess operating system.

17. The apparatus as in claim 10 further comprising:
multiple processors in said computer system, each process of said multiple processes executing on a different processor of said multiple processors.

18. A computer system having multiple processes executing therein, said processes sharing a common memory, comprising:
a memory usage data structure (MUDS) for each process executing in said computer system, said MUDS having a bitmap field having a bit corresponding to each block of allocatable memory;
when a elected memory block is allocated to a selected process, setting, in a MUDS of said selected process, a bit corresponding to said selected memory block to the value of "1";
when a memory block is not allocated to any process, setting, in said MUDS of said selected process, a bit corresponding to said memory block to the value of "0";
a master MUDS made by combining said MUDS maintained by said each process, said master MUDS having bits set to a value of "0" for free memory blocks, and said master MUDS having bits set to a value of "1" for memory blocks allocated to all processes of said multiprocess computer system;
multiple processors in said computer system, each process of said multiple processes executing on a different processor of said multiple processors; and,
a router, wherein said each processor further comprises interface processors of said router.

19. A method of recovering memory blocks in a multiprocessor computer system, comprising:
maintaining a buffer usage data structure (BUDS) by each processor of the multiprocessor computer system, said BUDS having a bitmap field having a bit corresponding to each block of allocatable memory;
setting, in a BUDS of a selected processor, a bit corresponding to a selected memory block to the value of "0" when said selected memory block is not owned by said selected processor;
setting said bit corresponding to said selected memory block to the value of "1" when said memory block is owned by said selected processor; and,
combining said BUDS maintained by said each processor to generate a master BUDS, said master BUDS having bits set to a value of "0" for free memory blocks, and said master BUDS having bits set to a value of "1" for memory blocks owned by any of said processors of said multiprocessor computer system.

20. The method of claim 19 further comprising:
selecting said multiprocessor system as a router, wherein said each processor further comprises interface processors.

21. The method of claim 19 further comprising:
combining said BUDS, maintained by said each processor, by a master processor to generate said master BUDS.

22. The method of claim 19 further comprising:
performing said combining step in response to expiration of a timer.

23. The method of claim 19 further comprising:
performing said combining step in response to a request generated by a processor.

24. A multiprocessor computer system having multiple processors therein, said multiple processors sharing a common buffer memory, comprising:
a buffer usage data structure (BUDS) maintained by each processor of the multiprocessor computer system, said BUDS having a bitmap field having a bit corresponding to each block of allocatable memory;
when a selected memory block is allocated to a selected processor, setting a bit corresponding to said selected memory block to the value of "1";
when said selected memory block is not allocated to said selected processor, setting said bit corresponding to said selected memory block to the value of "0"; and,
a master BUDS generated by combining said BUDS maintained by said each processor, said master BUDS having bits set to a value of "0" for free memory blocks, and said master BUDS having bits set to a value of "1" for memory blocks owned by any of said processors of said multiprocessor computer system.

25. The apparatus as in claim 24 further comprising:
a free memory, wherein all memory blocks having their corresponding bit in said master BUDS set to a value of 0 are transferred to said free memory.

26. The apparatus as in claim 24 further comprising:
a master process to generate said master BUDS by combining said BUDS maintained by said each processor.

27. The apparatus as in claim 24 further comprising:
a timer, said combining step performed in response to expiration of said timer.

28. The apparatus as in claim 24 further comprising:
a request generated by a processor, said combining step performed in response to said request.

29. The apparatus as in claim 24 wherein said computer system further comprises:
a router, wherein said each processor further comprises interface processors of said router.

30. A computer system having multiple processes executing therein, said processes sharing a common memory, comprising:
means for maintaining a memory usage data structure (MUDS) for each process executing in said computer system, said MUDS having a bitmap field having a bit corresponding to each block of allocatable memory;
means for setting a bit corresponding to a selected memory block to the value of "1" when said memory block is allocated to said selected process;
means for setting said bit corresponding to said selected memory block to the value of "0" when said selected memory block is not allocated to said selected process; and,
means for combining said MUDS maintained by said each process to generate a master MUDS, said master MUDS having bits set to a value of "0" for free memory blocks, and said master MUDS having bits set to a value of "1" for memory blocks allocated to any processes of said multiprocess computer system.

31. A method of recovering memory blocks in a multiprocessor computer system, comprising:
means for maintaining a buffer usage data structure (BUDS) by each processor of the multiprocessor computer system, said BUDS having a bitmap field having a bit corresponding to each block of allocatable memory;
means for setting, in a BUDS of a selected processor, a bit corresponding to a selected memory block to the value of "0" when said selected memory block is not owned by said selected processor;
means for setting said bit corresponding to said selected memory block to the value of "1" when said memory block is owned by said selected processor; and,
means for combining said BUDS maintained by said each processor to generate a master BUDS, said master BUDS having bits set to a value of "0" for free memory blocks, and said master BUDS having bits set to a value of "1" for memory blocks owned by any of said processors of said multiprocessor computer system.

32. A computer readable media comprising instructions for execution on a computer for the practice of the method of claim 1 or claim 19 or claim 31.

33. Electromagnetic signals propagating on a computer network, said electromagnetic signals carrying information for execution on a computer for the practice of the method of claim 1 or claim 19 or claim 31.

34. A method of recovering memory blocks in a computer system having multiple processes executing therein, said processes sharing a common memory, comprising:
maintaining a memory usage data structure (MUDS) for each process executing in said computer system, said MUDS having a bitmap field having a bit corresponding to each block of allocatable memory;
setting a bit corresponding to a selected memory block to a value indicating whether or not said selected memory block is allocated to said selected process; and,
combining said MUDS maintained by said each process to generate a master MUDS, said master MUDS having bits set to a value indicating whether the memory blocks are free or allocated to any processes of said multiprocess computer system.

35. The method of claim 34 further comprising:
resetting, in response to a failure of one of said processes, said bit corresponding to a selected memory block allocated to said failed process, to indicate that said selected memory block is no longer allocated to any process.

36. The method of claim 34 further comprising:
executing said multiple processes on a processor in said computer system.

37. The method of claim 36 further comprising:
selecting said computer system as a router.

38. The method of claim 34 further comprising:
executing said multiple processes on different processors in said computer system.

39. The method of claim 38 further comprising:
selecting said computer system as a router, a processor of said multiple processors being an interface processor.

40. A computer system having multiple processes executing therein, said processes sharing a common memory, comprising:

a memory usage data structure (MUDS) for each process executing in said computer system, said MUDS having a bitmap field having a bit corresponding to each block of allocatable memory, each said bit being set to a value indicating whether or not said selected memory block is allocated to said selected process; and, a master MUDS made by combining said MUDS maintained by said each process, said master MUDS having bits set to a value indicating whether the memory blocks are free or allocated to any processes of said multiprocess computer system.

41. The apparatus of claim 40 further comprising:

a processor to reset, in response to a failure of one of said processes, said bit corresponding to a selected memory block allocated to said failed process, to indicate that said selected memory block is no longer allocated to any process.

42. The apparatus of claim 40 further comprising:

a processor in said computer system, said multiple processes executing on said processor.

43. The apparatus of claim 42 further comprising:

a router as said computer system.

44. The apparatus of claim 40 further comprising:

multiple processors in said computer system, each process of said multiple processes executing on a different processor of said multiple processors.

45. The apparatus of claim 44 further comprising:

a router as said computer system, a processor of said multiple processors being an interface processor.

46. A computer system having multiple processes executing therein, said processes sharing a common memory, comprising:

means for maintaining a memory usage data structure (MUDS) for each process executing in said computer system, said MUDS having a bitmap field having a bit corresponding to each block of allocatable memory;

means for setting a bit corresponding to a selected memory block to a value indicating whether or not said selected memory block is allocated to said selected process; and, means for combining said MUDS maintained by said each process to generate a master MUDS, said master MUDS having bits set to a value indicating whether the memory blocks are free or allocated to any processes of said multiprocess computer system.

47. A computer readable media, comprising said computer readable media containing instructions for execution in a processor for the practice of the method of claim 34.

48. Electromagnetic signals propagating on a computer network, comprising said electromagnetic signals carrying instructions for execution on a processor for the practice of the method of claim 34.

* * * * *